Dec. 23, 1958 C. P. SMITH 2,866,001

AUTOMATIC VOICE EQUALIZER

Filed March 5, 1957 3 Sheets-Sheet 1

INVENTOR.
CALDWELL P. SMITH
BY Wade Koontz AND
Julius Louis Rubinstein
ATTORNEYS Dec. 23, 1958 C. P. SMITH 2,866,001

AUTOMATIC VOICE EQUALIZER

Filed March 5, 1957 3 Sheets-Sheet 2

INVENTOR.
CALDWELL P. SMITH

BY Wade Koontz AND
Julius Louis Rubinstein
ATTORNEYS

AUTOMATIC VOICE EQUALIZER

Filed March 5, 1957

INVENTOR.
CALDWELL P. SMITH

BY Wade Koontz AND Julius Louis Rubinstein
ATTORNEYS 2,866,001
Patented Dec. 23, 1958

2,866,001

AUTOMATIC VOICE EQUALIZER

Caldwell P. Smith, Bedford, Mass., assignor to the United States of America as represented by the Secretary of the Air Force Application March 5, 1957, Serial No. 644,188

3 Claims. (Cl. 179—15.55)

(Granted under Title 35, U. S. Code (1952), sec. 266)

The invention described herein may be manufactured and used by or for the United States Government for governmental purposes without payment to me of any royalty thereon.

This invention relates to the electrical transmission of voice signals and, more particularly, to a device for automatically optimizing and equalizing the frequency power distribution of a voice signal.

Devices for extracting the fundamental pitch of voice signals, or for the automatic extraction of the basic formants of human speech, or for pattern matching voice circuits, etc., tend to be rather sensitive to the frequency power distribution of the input voice signal. They operate best when the frequency power distribution is uniform, i. e., equalized. If a particular voice signal is characterized by a frequency spectrum that has been "tilted," i. e., subjected to a rising or falling frequency power characteristic, or if some portions of the speech spectrum deviate from the optimum or "standard" (based on statistical determinations) for which these devices are calibrated, errors in operation can occur. These errors may easily be caused by using different microphones, since microphones devised primarily for voice uses are ordinarily rather variable in their frequency response characteristics, and high quality "standardized" microphones and voice circuits are often unavailable. Other operational impairments can occur when the talker is in a frequency-selective acoustical environment or when the voice circuits accentuate some part of the talker's speech spectrum.

In essence, this device measures the spectrum of a particular input voice signal, and compares it with a standard spectrum (based on statistical determinations). If the two are similar, no correction occurs. If they are not similar, this device automatically corrects and equalizes the frequency power distribution of the input signal so its spectrum conforms to the "norm."

The principal object of this invention, therefore, is to provide a device for equalizing the frequency power distribution of a voice signal in accordance with a predetermined standard.

Other objects of this invention will become more apparent when understood in the light of the accompanying specification and drawings wherein.

Figure 1:
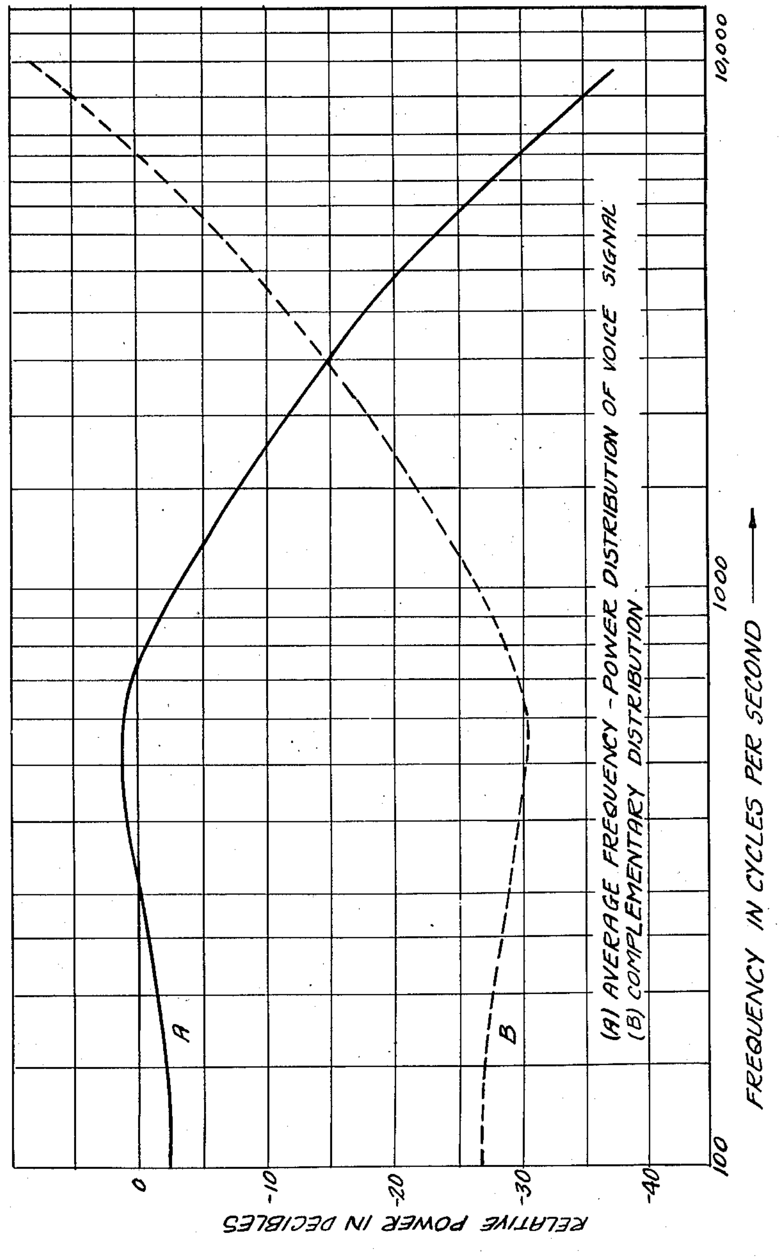
Fig. 1 is a chart illustrating the typical average frequency power distribution of a voice signal and also a frequency power distribution that is complementary to the normal distribution.

Referring to Fig. 1, curve A shows how the average power of a voice signal is distributed over a frequency spectrum. This particular curve, if derived with high quality microphones and measured under standardized conditions, may be used as the "norm" to which other input signals are corrected. The above mentioned class of devices should be designed for optimum performance with this standard input signal. Curve B illustrates the frequency power distribution complementary to the standard distribution. A fixed frequency equalizer having a frequency characteristic shown in curve B will act on a standard voice signal whose frequency power distribution is shown in curve A to produce a "flat" distribution of an average power, i. e., an average power distribution that is uniform over the voice spectrum.

Figure 2:
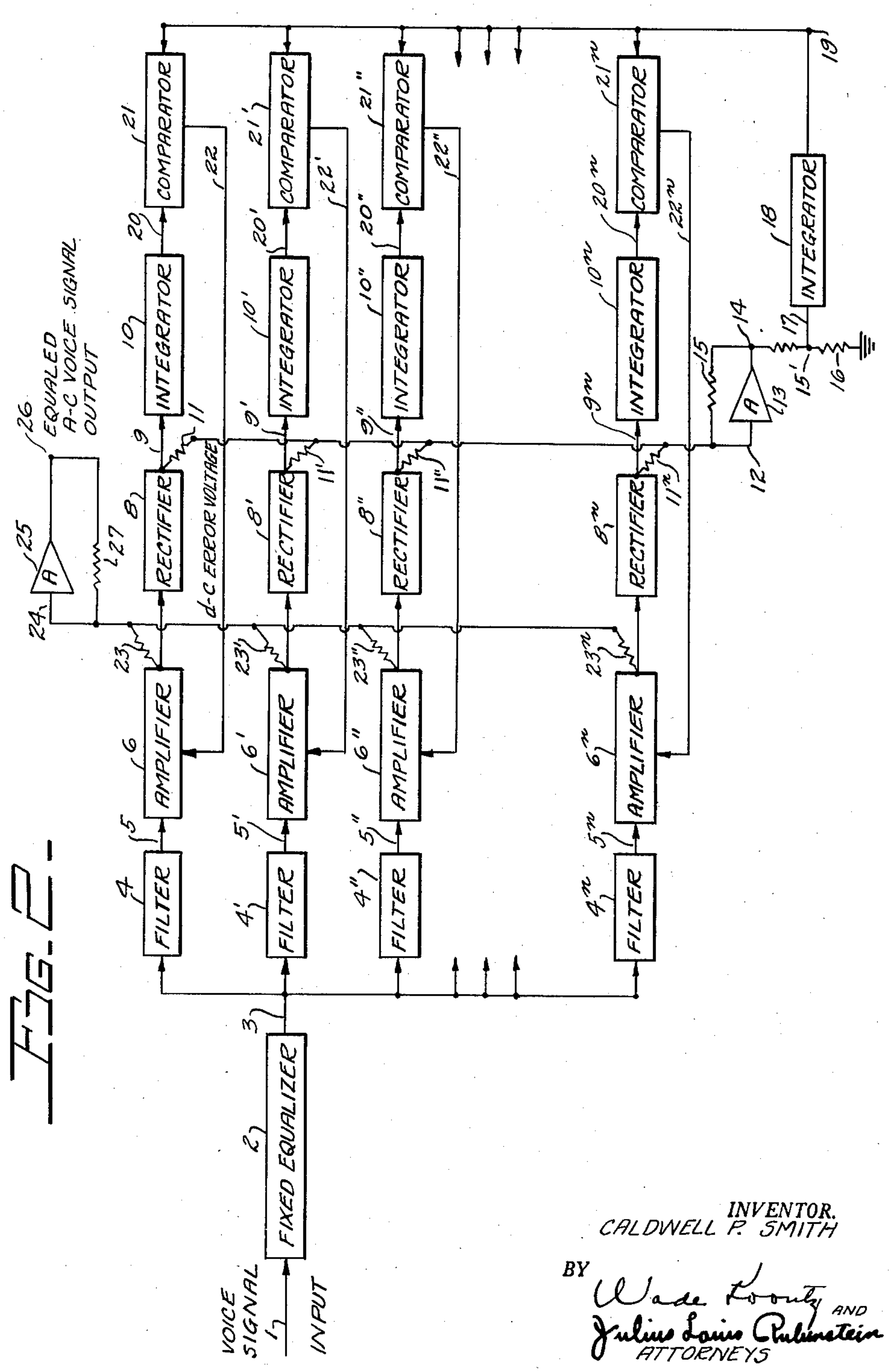
Fig. 2 illustrates the automatic voice equalizer in block diagram form.

Referring now to Fig. 2, the input voice signal appearing as an A. C. voltage from a microphone and any other associated circuits (not shown) is impressed on an input terminal 1 connected to a fixed equalizer 2. This equalizer has a frequency characteristic that is the inverse of the frequency power distribution of a "standard" input voice signal. The output signal from the fixed equalizer 2 is connected to a bus 3 that provides a common input terminal to the array of contiguous bandpass filters 4, 4', 4'' . . . etc. The bandpass filters are designed to produce relatively narrow channel bandwidths in comparison with the total voice spectrum. The gains of the bandpass filters are equal at their center frequencies and these are spaced evenly on a frequency scale appropriate for voice signal analysis. The exact parameters of bandpass filter circuits are not critical and from 16 to 30 filters can be used, covering the voice frequency circuit from 100 to about 4,000 cycles per second. The adjacent filter channels overlap at their half-power points.

The set of bandpass filters divides the voice signal into its frequency components, and they appear as A.-C. voltages at terminals 5, 5', 5'' . . . etc., and these signals are inputs to variable gain amplifiers 6, 6', 6'' . . . . The gains of these amplifiers are controlled by means of D.-C. control voltages applied by terminal wires 22, 22', 22'' . . . . The quiescent points of these variable gain amplifiers 6, 6', 6'' . . . etc., are set so that the amplification of any A.-C. input signal voltage appearing at terminal 5 will be increased in proportion to the amplitude of a D.-C. control voltage of positive polarity impressed on terminal wire 22, and will be decreased in proportion to the amplitude of a negative D.-C. voltage impressed on that terminal wire. This arrangement permits the amplification in each filter channel to be dependently regulated by means of the D.-C. control voltages in each channel.

The A.-C. output signals from the variable gain amplifiers are connected to rectifiers 8, 8', 8'' . . . etc. The outputs of these rectifiers are D.-C. voltages appearing on terminals 9, 9', 9'', and these are proportional to the amplitudes of the A.-C. signals in each filter channel. The rectified output signals in each channel are connected to integrator circuits 10, 10', 10'' . . . etc. These integrator circuits time average the rectified output signals in each channel. The time constants of the averaging circuits are all equal and a time constant of 25 seconds has been found to be practical for many applications. If the averaging time is too short, the resulting voltages would represent spectra of individual phonemes; if too long, the equalizer would operate too slowly. Some measurements with connected speech read at about 200 words a minute reveal that with a 25 second averaging time variability due to individual phonemes was never more than 4 to 5 decibels. This was considered to be satisfactory. It is important to note that changes in the amplitude of the input voice signal are not relevant in this measurement and that amplitude components, present as a common mode in all frequency bands, cancel out.

In addition to the connection to the integrator circuits, the rectified output signals in each channel are connected through resistors 11, 11', 11'' . . . etc. to terminal 12 which is the input terminal for a D.-C. amplifier 13. The ensemble of resistors 11, D.-C. amplifier 13, and feedback resistor 15 comprise a voltage summation circuit of a type well known in the electronics art. The output terminal 14 of amplifier 13 equals the sum of the D.-C. voltages appearing at the outputs of the rectifiers, but are inverted in polarity. The D.-C. (sum) voltage at terminal 14 is connected to a voltage divider circuit comprising resistors 15′ and 16. The ratio of resistors 15′ and 16 is established so that the sum voltage at terminal 14 is divided by a constant factor *n*, where *n* is the number of filter channels employed in the analyzer. As a result, the D.-C. voltage appearing at terminal 17 is the mean voltage of the sum of the D.-C. voltages appearing at the output of the rectifiers in each channel. It is evident that other circuit means are readily available as alternates to those shown in Fig. 2.

The mean D.-C. voltage appearing at terminal 17 is connected to the input of integrator circuit 18 which is identical in averaging time to that of integrator circuits 10, 10′, 10″ in each of the filter channels. Therefore, the output terminal 19 of the integrator 18 is a D.-C. voltage representing the time averaged mean voltage. Simultaneously, the outputs 20, 20′, 20″, of each of the integrators 10, 10′, 10″ represents the time averaged D.-C. voltages from each filter channel. These D.-C. voltages are indicative of the average frequency power distribution of the input voice signal. If the input voice signal conforms to the standard statistically determined distribution shown in curve A in Fig. 1, the set of D.-C. voltages appearing at terminals 20, 20′, 20″ will be equal in amplitude, and will also be equal in amplitude but opposite in polarity to the mean average voltage appearing at terminal 19. This is because the combination of the "standard" voice input signal and the fixed complementary equalizer 2 act to create a "flat" or uniform distribution of voice power. If a portion of the voice spectrum deviates from the normal distribution, the voltage levels in some frequency bands will be larger than the mean average voltage while voltage levels in others will be less. Therefore, a comparison of the average voltage in each filter channel with the mean average voltage of the filter band array provides a means for ascertaining deviations of an input voice signal from the normal or standard frequency voice power distribution.

This comparison is achieved in comparator circuits 21, 21′, 21″ . . . etc. Essentially the comparators are adding circuits. The time averaged mean voltage appearing at terminal 19 is added to each of the time averaged channel voltages. Since as stated above the mean average voltage is inverted in polarity with respect to the average channel voltages, the net effect is that of subtraction. If the two are equal, the voltage output from the comparator circuit will be 0. This means there will be no change in the variable gain amplifiers 6, 6′, 6″ . . . etc. and consequently there will be no change in the channel gain. But if the voltage level at terminal 20, in one of the filter channels is larger, for example, than the mean average voltage at terminal 19, a negative voltage will appear on terminal wire 22. This negative voltage is proportional to the difference between the two voltage levels and acts to decrease the amplification of the amplifier 6. If the relative values of the two voltages were reversed, a positive voltage would appear on terminal wire 22, increasing the gain of amplifier 6. Thus, it can be seen that the D.-C. output voltage from the comparator 21, 21′, 21″ . . . etc. acts as an error signal voltage indicating whether the average signal level in each filter channel is equal to, greater than, or less than the average mean signal level of all the channels; and at the same time, this error voltage automatically adjusts the gains in each filter channel so that the average signal level in each filter channel is equal to that in all other channels.

The A.-C. output signals from the variable gain amplifier 6, 6′, 6″ . . . etc. are also connected by means of resistors 23, 23′, 23″ . . . etc. to an amplifier in conjunction with a feedback resistor 27. This provides a summation of the A.-C. signals from all the filter channels and recovers the equalized A.-C. voice signal at terminal 26. Resistors 23 may be of equal size or may be weighted in accordance with the characteristics of curve B in Fig. 1. The final result is that the A.-C. voice signal at the output terminal 26 is automatically adjusted by the comparator circuit so that the average frequency power distribution substantially conforms to that of the standard or "norm."

It is obvious that alternative designs of the automatic equalizer can be utilized. For example, the function of the complementary equalizer 2 may be incorporated directly into the filter design, by weighting the gains of the filter channels at their center frequencies in accordance with the characteristics of curve B shown in Fig. 1. If this is done, the fixed frequency equalizer 2 may be dispensed with and the voice signal may be directly connected to input bus 3.

The filter circuits may also be single-tuned circuits, double-tuned circuits or even more complex bandpass filter networks. If the automatic equalizer is utilized to improve the reliability of a voice analyzer used in speech bandwidth compression, the analyzing filters may be the same ones used in a voice analyzer system, the automatic equalizer being incorporated directly into the analyzer system. If the automatic voice analyzer is used in order to produce an automatically corrected A.-C. voice signal, it is more advantageous to use relatively simple filters such as single-tuned circuits, since an array of filters of this type with crossovers at the half-power points, will more readily recombine to recover an automatically equalized and optimized A.-C. signal at terminal 26.

The variable gain amplifiers shown in Fig. 2 can be variable-mu electron tubes, balanced diode modulators or any of the other various circuit means used in the electronic art for modulating or controlling the transmission of an A.-C. signal in proportion to the amplitude of a D.-C. control voltage.

The rectifiers 8, 8′, 8″ . . . etc. in Fig. 2 are of conventional design for converting an A.-C. signal to a D.-C. signal. They may be either half-wave or full-wave rectifiers. Various circuit means are available for the integrator function designated as 10, 10′, 10″ and 18 in Fig. 2. The simplest circuit of this type is a simple resistor-capacitor integrator. Alternatively, more complex active or passive integrators may be used. Amplifiers 13 and 25 are of conventional design. The comparator circuits 21, 21′, 21″ . . . etc. are typically D.-C. amplifiers with differential inputs.

Figure 3:
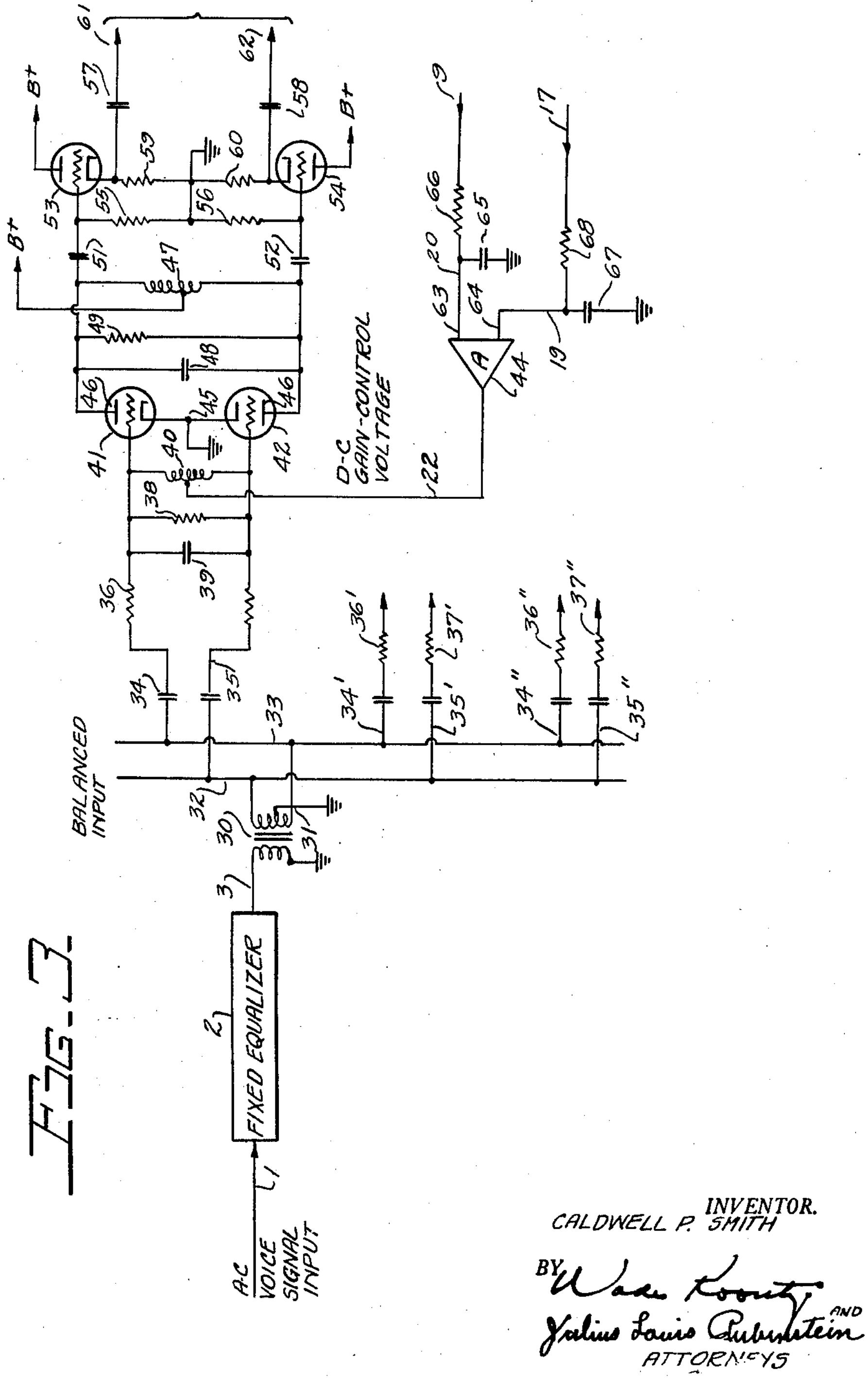
Fig. 3 illustrates a representative circuit of one channel of the equalizer disclosed in Fig. 2.

As shown in greater detail in Fig. 3, an A.-C. voice signal is impressed on terminal 1 as an input signal to the fixed frequency analyzer 2. This analyzer has frequency response characteristics that are complementary to the frequency-power distribution of a "standard" or statistically determined voice signal. The output signal from equalizer 2 is connected to coupling transformer 30 whose secondary 31 is connected to bus 3 composed of bus wires 32 and 33. These wires are common to the entire filter input array. The balanced or partially balanced A.-C. signal appearing on bus wires 32 and 33 is coupled through coupling capacitors 34 and 35 and resistors 36 and 37 in each filter channel to the resonant circuit consisting of inductor 40, capacitor 39 and resistor 38. This resonant circuit is frequency-selective, and the capacitors 34 and 35 serve to isolate the input bus wires 32 and 33 from the D.-C. potential of the resonant circuit and resistors 36 and 37 serve to isolate the resonant circuit from the input bus wires. The resonant circuit in each filter channel is connected to the grids of triode tubes 41 and 42 which may be contained in a single envelope. Triodes 41 and 42 are constructed with a variable-mu characteristic so the amplification of these tubes is proportional to the D.-C. grid bias. The center tap of the inductor 40 is returned through lead terminal 22 to a D.-C. control voltage which is the output terminal of the D.-C. differential amplifier 44.

The cathodes 45 of tubes 41 and 42 are returned to ground and the plates 46 are connected across another resonant circuit consisting of inductor 47, capacitor 48 and resistor 49, to increase the frequency resolution in each filter channel. The center tap of inductor 47 is connected by a lead 50 to a source of D.-C. plate voltage. This circuit arrangement produces a tuned-plate amplifier in which the grid and plate circuits are synchronously tuned. The bandwidth of each filter channel can be adjusted by means of resistors 38 and 49 and the center frequencies can be adjusted by a proper choice of values for the inductances 40 and 47 and the capacitances 48 and 39.

Capacitors 51 and 52 couple the A.-C. output signal from the dual triodes 41 and 42 to the grids of triode tubes 53 and 54 in a cathode follower amplifier used as an impedance-matching device. The grid returns for the cathode followers are through grid resistors 55 and 56 and the output signals are coupled out through capacitors 57 and 58. The cathodes of tubes 53 and 54 are grounded through cathode resistors 59 and 60. The A.-C. output appears at terminals 61 and 62. This output signal is connected to rectifier circuits of a conventional type (not shown) and also to a voltage summation circuit of conventional type (not shown). The amplification at the mid-band frequency of each filter channel is controlled by the D.-C. voltage impressed on the center tap of inductor 40. In the example shown in Fig. 3, the variable-mu dual triode tubes disclosed are the General Electric type 6386. Alternatively, variable-mu pentodes could be used.

Amplifier 44 comprising a part of one of the comparator circuits 21, 21′, 21″ . . . etc. is a D.-C. amplifier with a differential input of conventional type. The D.-C. output voltage at lead 22 is thus proportional to the difference between the D.-C. voltages appearing at inputs 63 and 64. Capacitor 65 and resistor 66 comprise one of the integrating or averaging circuits 10, 10′, 10″ and capacitor 67 and resistor 68 comprise the other integrating circuit 18. The D.-C. input signals to these two averaging circuits are impressed on terminals 9 and 17.

The quiescent point of D.-C. amplifier 44 is adjusted so that when both D.-C. input signals are equal, the quiescent D.-C. voltage appearing at the center tap of inductor 40 leaves triodes 41 and 42 biased at the midpoint of their linear operating range, establishing a condition in which a more positive D.-C. voltage at the center tap will increase the amplification of triodes 41 and 42, while a more negative voltage will decrease the amplification. Terminal 9 is connected to the D.-C. output terminal of the rectifier circuit of the filter channel, see Fig. 2. The polarity is so chosen that an increase in D.-C. level at terminal 9 will cause the voltage at the center tap of inductor 40 to become more negative. Terminal 17, as shown in Fig. 3, is the mean value of the rectified voltage signals in each channel, with polarity chosen so that amplifier 44 will subtract the two input voltage signals on terminals 63 and 64.

In summary, this circuit establishes a homeostatic or regulated system in which the feedback control in each filter channel automatically corrects the gains in that channel. If the incoming signal already conforms to the typical spectrum having the characteristic stored (inversely) in the design of fixed equalizer, no gain correction takes place since the voice energy is on the average already equally divided in the frequency channels, and equal D. C. voltage levels appear on the input terminal of each of the D. C. amplifiers. When the energy distribution of the incoming voice signal is not uniform, the feedback loops regulate the amplification of the various channels until the average distribution of energy is made uniform.

The automatic frequency equalization does not take place instantaneously since a statistical sample of a voice signal is required. The time average of the integrator circuits has been established on the assumption of a normal distribution of speech events in the talker's voice signal. If the talker does not use typical sequences of speech sounds, the time averaging in the indicator will cause the automatic equalizer to reach incorrect conclusions. This suggests the possibility of a further refinement in which the voltage averaging time in the integrator circuits is automatically controlled in accordance with the syllabic rate of the talker.

It is evident that if voice analyzing and synthesizing equipment is designed for optimal effectiveness with a standardized voice signal, this automatic equalizer provides a means for optimizing the frequency power distribution of an incoming voice signal to harmonize with the speech analyzing and synthesizing equipment for which it is to be used.

Obviously, many modifications and variations of this invention can be made and the above description is to be construed as merely illustrative and not restrictive. The scope of this invention is to be determined by the appended claims.

I claim:

1. An apparatus of the class described comprising a plurality of contiguous bandpass filters for establishing separate filter channels, each bandpass filter having a common speech input and separate voltage outputs, variable gain amplifiers connected to the output of each bandpass filter, means for rectifying the output signal of each variable gain amplifier, and means for time averaging the rectified output of each filter channel over a speech signal of predetermined length to produce an average voltage in each filter channel, means for producing a voltage corresponding to the mean of the rectified voltages in the entire set of bandpass filters, and means for time averaging the mean voltage of the entire set of bandpass filters over a speech signal of said predetermined length, means for comparing the average mean voltage of the entire set of rectified voltages with the average rectified signal voltage in each filter channel to produce an error control voltage in each filter channel proportional to the difference between the two voltages, said error control voltage being applied to the variable gain amplifier in each channel to control the gain thereof and regulate the amplification of the voltage in that channel so the frequency power distribution in the speech signal is made uniform.

2. The apparatus set forth in claim 1 including means for summing the alternating current signal voltage outputs of each filter channel to recover the equalized voice signal.

3. An apparatus of the class described comprising in combination, a fixed frequency spectrum equalizer having a speech input and a voltage output, said fixed equalizer having characteristics complementary to a standard distribution of voice frequency power for producing uniform frequency power distribution in a standard input voice signal, a plurality of contiguous bandpass filters for establishing separate filter channels connected to the output of the fixed frequency spectrum equalizer, each bandpass filter having a common signal input and a separate voltage output, variable gain amplifiers connected to the output of each bandpass filter, means for rectifying the output signal of each variable gain amplifier and means for averaging the rectified output of each filter channel over a speech signal of predetermined length to produce a time averaged voltage in each channel, means for obtaining the mean of the rectified voltages in each filter channel and means for averaging the mean voltage over a speech signal of the said predetermined length to produce a time averaged mean voltage, means for producing a control voltage proportional to the difference between the time averaged mean voltage and the time averaged rectified voltage in each channel, means for feeding back the control voltage to the variable gain amplifier for controlling the amplification in each channel to establish equal signal levels in each channel, means for summing the alternating current outputs of each filter channel to recover a voice signal substantially identical to the equalized statistically determined voice signal.

References Cited in the file of this patent

UNITED STATES PATENTS

| | | |
|---|---|---|
| 2,151,091 | Dudley | Mar. 21, 1939 |
| 2,243,527 | Dudley | May 27, 1941 |
| 2,458,227 | Vermuelen et al. | Jan. 4, 1949 |
| 2,635,146 | Steinberg | Apr. 14, 1953 |